(12) United States Patent
Benedictus et al.

(10) Patent No.: US 7,514,155 B2
(45) Date of Patent: Apr. 7, 2009

(54) HIGH STRENGTH ALUMINIUM ALLOY BRAZING SHEET

(75) Inventors: Rinze Benedictus, Delft (NL); Achim Bürger, Hoehr-Grenzhausen (DE); William Sinclair Miller, Ijmuiden (NL); Alfred Johann Peter Haszler, Vallendar (DE)

(73) Assignee: Aleris Aluminum Koblenz GmbH, Koblenz (DE)

( * ) Notice: Subject to any disclaimer, the term of this patent is extended or adjusted under 35 U.S.C. 154(b) by 0 days.

(21) Appl. No.: 10/891,450

(22) Filed: Jul. 15, 2004

(65) Prior Publication Data

US 2005/0064226 A1   Mar. 24, 2005

Related U.S. Application Data

(60) Provisional application No. 60/487,977, filed on Jul. 18, 2003.

(30) Foreign Application Priority Data

Jul. 18, 2003   (EP)   ................... 03077272

(51) Int. Cl.
*B32B 15/01* (2006.01)
*B32B 15/20* (2006.01)
(52) U.S. Cl. .............. 428/654; 428/650; 148/523; 148/537; 219/615
(58) Field of Classification Search .............. 428/654; 148/535; 164/91; 29/469, 527.7
See application file for complete search history.

(56) References Cited

U.S. PATENT DOCUMENTS

| | | | |
|---|---|---|---|
| 2,821,014 A | 1/1958 | Miller | |
| 6,019,939 A | 2/2000 | Gray et al. | |
| 6,129,143 A | 10/2000 | Hasegawa et al. | |
| 6,294,272 B2 * | 9/2001 | Sontgerath et al. | 428/654 |
| 6,302,973 B1 * | 10/2001 | Haszler et al. | 148/437 |
| 6,352,789 B1 * | 3/2002 | Hurd et al. | 428/654 |
| 6,413,331 B1 | 7/2002 | Hurd et al. | |
| 6,555,251 B2 | 4/2003 | Kilmer | |
| 2002/0037426 A1 | 3/2002 | Yamada et al. | |
| 2002/0142185 A1 | 10/2002 | Kilmer | |
| 2003/0062143 A1 * | 4/2003 | Haszler et al. | 428/654 |
| 2003/0079856 A1 | 5/2003 | Kilmer et al. | |

FOREIGN PATENT DOCUMENTS

EP   0 712 681   * 5/1996
EP   0718072   6/1996

(Continued)

OTHER PUBLICATIONS

H. Engstrom and L. Gullman, "A Multilayer Clad Aluminum Material With Improved Brazing Properties", Brazing, 18th International Conference, Abstracts, vol. 68, pp. 242-243, 18th International AWS Brazing Conference, Mar. 26-27, 1987 (Chicago)(Publisher AWS).

*Primary Examiner*—Jennifer McNeil
*Assistant Examiner*—Jason L Savage
(74) *Attorney, Agent, or Firm*—Novak Druce + Quigg, LLP (57) ABSTRACT

Disclosed is a high strength aluminium alloy brazing sheet, including an Al—Cu core layer and at least one clad layer, the core layer having the following composition (in weight percent): Cu: 1.2-4.0, Mn: 0.06-1.5, Mg: 0.06-1.5, Si: up to 0.5, Zn: $\leq 0.4$, Zr: $\leq 0.25$, Fe: $\leq 0.5$, Ti: $\leq 0.25$, Cr: $\leq 0.25$; V$\leq 0.25$; the balance substantially aluminium and impurities, the clad layer including an Al—Si based filler alloy and being applied on at least one side of the core layer. Also disclosed is a brazed assembly including the brazing sheet and the use of the brazing sheet for a brazing application such as a heat exchanger.

28 Claims, 2 Drawing Sheets

FOREIGN PATENT DOCUMENTS

| | | | |
|---|---|---|---|
| EP | 0718072 A1 * | 6/1996 | |
| EP | 0799667 | 10/1997 | |
| EP | 0823305 | 2/1998 | |
| EP | 1175954 | 1/2002 | |
| JP | 02030394 | 1/1990 | |
| JP | 3-161189 A * | 7/1991 | ................ 219/85.2 |
| JP | 09176767 | 7/1997 | |
| WO | 0249798 | 6/2002 | |

* cited by examiner

HIGH STRENGTH ALUMINIUM ALLOY BRAZING SHEET

CROSS-REFERENCE TO RELATED APPLICATIONS

This claims priority under 35 USC 119 from European patent application serial number EP 03077272.7 filed Jul. 18, 2003 and U.S. provisional patent application Ser. No. 60/487,977 filed Jul. 18, 2003, both incorporated herein by reference in their entirety.

FIELD OF THE INVENTION

The present invention relates to an aluminium alloy brazing sheet for brazing which has high strength, high formability, improved brazing properties and an excellent corrosion resistance. The invention relates further to a brazed assembly comprising such brazing sheet and to a method for producing such an aluminium alloy brazing sheet. More specifically, the present invention relates to a high strength multi-layered aluminium material with improved brazing properties, comprising an interlayer between braze cladding and core, thereby improving corrosion resistance and reducing penetration of silicon and magnesium during the brazing cycle.

DESCRIPTION OF THE RELATED ART

It is known in the art to apply aluminium alloy brazing sheet for use, for example, in heat exchangers, oil coolers, inter coolers, evaporators or condensers of automobiles or other vehicles or applications using heat exchangers. Conventionally, these assemblies are manufactured from brazing sheets for brazing using Al—Mn based aluminium alloys or Al—Mg—Si based aluminium alloys as a core material and Al—Si based aluminium alloys, typically of the Aluminum Association (AA)4xxx-series alloys, as a clad brazing filler material for conventional brazing applications. Once these brazing sheets are assembled and brazed to for example a heat exchanger for automobiles a cooling medium or a heating medium is charged through the assembly. Hence, it is crucial to prevent leakage of the brazed assembly while at the same time reducing the weight and size of such assemblies. Therefore, recent developments showed assemblies made from brazing sheets which were improved to reduce the size, weight and cost by decreasing the material thickness and changing the design of the structure of the heat exchanger.

To improve the brazing quality and durability of heat-treatable brazing sheet a multi-layered clad aluminium material was developed, see H. Engström and L.-O. Gullman, "A Multilayer Clad Aluminium Material with Improved Brazing Properties", 18$^{th}$ International AWS Brazing Conference, of Mar. 24-26, 1987 in Chicago. In this paper it is proposed to use an interlayer between the braze cladding and the core layer in order to increase the corrosion resistance. Furthermore, the results showed that silicon penetration along grain boundaries of the core layer was significantly delayed in such multilayered material compared to standard "core/braze"-material and more silicon remained in the clad layer and the penetration depth was reduced.

JP-02030394 discloses an aluminium brazing sheet consisting of a core material, an Al—Si alloy brazing material and an intermediate layer of pure Al alloy on one or both sides of the core material. The core layer comprised essentially the following composition (in weight %):
Cu: 0.10-1.0
Mn: 0.30-1.5
Mg: 0.10-1.0, the balance aluminium with inevitable impurities.

JP-09176767 discloses an aluminium brazing sheet for vacuum brazing comprising a core layer with the following composition (in weight %):
Cu: 0.10-0.80
Mn: 0.30-1.5
Ti: 0.01-0.20, the balance aluminium with inevitable impurities, a brazing filler layer having a composition consisting of (in weight %) Si: 5.0 to 15, Mg: 0.30 to 2.5, the balance aluminium with inevitable impurities as well as an intermediate sacrificial corrosion layer composed of an Al—Zn alloy containing (in wt. %) 2.0-5.0 Zn.

EP-0823305-A2 discloses a brazing sheet with good corrosion resistance for use in heat exchangers comprising a core layer with the following composition (in weight %):
Cu: 0.15-0.35
Mn: 0.50-1.6
Mg: 0.05-0.50
Ti: 0.06-0.30, the remainder aluminium and unavoidable impurities, a clad layer comprising an Al—Si—Mg type cladding material and an intermediate layer with (in weight %) Mn: 0.50-1.2, the remainder aluminium and unavoidable impurities as well as Mg: 0.05-1.20 as an option, thereby also disclosing the addition of Zn in an amount of (in weight %) 1.0-5.0. These multiclad or multilayered brazing sheets showed tensile properties after brazing of 140 MPa to 165 MPa.

EP-0799667-A1 discloses an aluminium alloy brazing sheet for brazed heat exchangers comprising a core layer with the following composition (in weight %):
Cu: 0.05-1.2 (optionally)
Mn: 0.50-1.5
Si: $\leq$0.60
Fe: $\leq$0.70, the balance aluminium and inevitable impurities, wherein the inevitable impurities are restricted to 0.60 wt % or below of Si and 0.70 wt % or below of Fe. Furthermore, such brazing sheet incorporates a clad layer of the Al—Si based filler alloy type and an intermediate layer comprising aluminium and inevitable impurities which are limited to a total amount of 1.0 wt %.

EP-1175954-A1 discloses a multi-layered aluminium alloy brazing sheet with a core layer comprising the following composition (in weight %):
Cu: 0.20-1.0
Mn: 0.30-1.5
Mg: $\leq$0.30
Si: 0.30-1.3
Fe: $\leq$0.20, the balance aluminium and inevitable impurities, a brazing filler material being formed on one surface of the core material comprising an Al—Si based aluminium alloy and a cladding material which is formed on the other side of the core material and which contains (in weight %):
Mg: 2.0-3.5
Zn: 0.50-2.0
Si: $\leq$0.20, the balance aluminium and inevitable impurities. Furthermore, it is described that it is not preferable to add magnesium to the core material, even though the adding of magnesium improves the strength of the brazing sheet, since in a NOCOLOK (registered trade mark) flux brazing method, the brazing property of a brazing sheet in which magnesium is added to a core material is significantly degraded. During brazing the magnesium penetrates to the surface of the clad brazing layer and effects the NOCOLOK flux salt.

WO-02/49798-A2 discloses a four layer heat treatable brazing sheet for use as a folded and/or welded tube for header/type type heat exchangers. The core layer is of an aluminium alloy containing (in wt. %):

Mn 0.5-1.7
Mg 0.1-1
Cu 0.02-1.2
Si up to 0.9
Ti 0.02-0.25.

The alloy compositions of the various distinct layers are optimised to provide sufficient internal corrosion resistance for use as tubing in a heat exchanger.

US-2002/0037426-A1 discloses an aluminium alloy brazing sheet for a heat exchanger having a four-layered structure with a core material, a clad layer with a filler alloy of an Al—Si alloy and a sacrificial anode material for an intermediate layer (interlayer) of an Al—Zn alloy wherein the core alloy is composed of (in wt. %):

Cu: 0.05-0.50
Mn: 0.05-2.0
Fe: 0.20-0.80
Si: 0.10-0.50, the balance aluminium and unavoidable impurities wherein the intermediate layer is composed of a composition comprising essentially (in weight %):

Cu: 0.40-1.0
Mn: 0.50-2.0
Si: 0.10-0.50
Fe: 0.20-0.80, the balance aluminium and unavoidable impurities.

SUMMARY OF THE INVENTION

Since it has been difficult to obtain a brazing sheet product which does not only have good brazing properties and formability characteristics but also a high strength and an improved corrosion resistance it is an object of the present invention to obtain these. More specifically, it is an object of the present invention to increase the yield strength after brazing and natural ageing from about 50 MPa of the conventional AA3xxx-alloy to at least 100 MPa and at the same time obtaining a high incipient melting point for the core layer in order to be able to produce light brazing assemblies having less thickness and less weight.

It is yet another object of the present invention to provide a method for producing a high strength aluminium alloy brazing sheet and/or a brazed assembly which manufacturing costs are lower than those of regular methods thereby using thinner materials to accomplish light weight and lower manufacturing costs as well as simultaneously producing a multi-clad or multilayered aluminium material.

The present invention meets one or more of these objectives by an high strength aluminium alloy brazing sheet product comprises an Al—Cu alloy core layer and at least one clad layer, the core layer comprising the following composition (in weight %):

Cu: 1.2 to 4.0
Mn: 0.06 to 1.5
Mg: 0.06 to 1.5
Si: $\leq 0.5$
Zn: $\leq 0.4$
Fe: $\leq 0.5$ and optionally one or more of:

Zr: $\leq 0.25$
Cr: $\leq 0.25$
V: $\leq 0.25$
Ti: $\leq 0.25$, the balance essentially aluminium and incidental elements and impurities (each <0.05, total <0.20), the clad layer comprising an Al—Si based filler alloy, typically of the AA4xxx type, and being placed on at least one side of the core layer.

In a further aspect of the invention there is provided a method of manufacturing such a high strength aluminium brazing sheet product.

Preferred embodiments are also described in this specification.

DETAILED DESCRIPTION OF THE PREFERRED EMBODIMENTS

As will be appreciated herein below, except as otherwise indicated, all percentages are by weight. Furthermore, alloy designations and temper designations refer to the Aluminum Association designations in Aluminum Standards and Data and the Registration Records, as published by the Aluminum Association.

By the addition of Cu the strength values of the brazing sheet product could be increased. However, the Cu content must be carefully balanced with the Mn and Mg content since the melting point of the core material is reduced by adding too much copper. At the same time the Cu content must be balanced with regard to an additional sacrificial interlayer since the addition of Cu increases also the corrosion potential of the resultant alloy which then becomes more noble. Hence, it has been found that the amount (in weight %) of Cu in the core layer is preferably in a range of 1.2 to 2.5, and more preferably in a range of 1.2 to 1.8. A more preferred lower limit for the Cu-content is 1.3%.

Manganese is an important alloying element for increasing the corrosion resistance and the strength of the core material. Since Mn adds to the mechanical strength without decreasing corrosion resistance it has been found that the amount of Mn in the core layer is preferably in a range of 0.1 to 1.0 wt. %, most preferably in a range of 0.1 to 0.5. A more preferred upper-limit for the Mn-content is 0.45 wt. %. However, too high amounts of Mn result in large intermetallic compounds which have an adverse effect on processability and corrosion resistance. Mn also makes the corrosion potential of the core material higher thereby assisting in improving the overall corrosion resistance.

Magnesium, together with Cu, also improves the mechanical strength, in particular after aging by the precipitation of an AlCuMg compound. However, an excessive amount of Mg results in penetration of Mg into the clad filler alloy and an undesired reaction with the brazing salt flux, e.g. NOCOLOK salt. It has been found that the amount of Mg in the core layer is preferably in a range of 0.2 to 0.95 wt. %, more preferably in a range of 0.3 to 0.8 wt. %.

Si contributes to improving the strength of the core alloy by solid solution strengthening in the matrix after brazing. Also, an intermetallic compound composed of $Mg_2Si$ is precipitated by reaction of Si with Mg in the core layer. The amount of Si in the core layer is preferably in a range of 0.1 to 0.25 wt. %. When the content of silicon exceeds 0.5 wt. % large Si containing compounds are precipitated which adversely lower the corrosion resistance of the core alloy.

Iron enhances the formation of detrimental large intermetallic compounds which are distributed throughout the alloy thereby promoting cracking of the alloy during forming. Hence, the amount (in weight %) of iron in the core layer should preferably be in a range of 0.1 to 0.4, and more preferably in a range of 0.10 to 0.30.

Preferably, zirconium, chromium, and/or vanadium, if added, should be below 0.25 wt. % each since they enhance the formation of intermetallic compounds thereby degrading processability of the brazing sheet and also the corrosion resistance. This is equally valid for titanium which should be kept below 0.25 wt. % since the addition of titanium above 0.25 wt % has been found to result in a lower resistance to corrosion and less formability.

A preferred embodiment of the present invention comprises a core layer as described above and a clad layer being formed on both sides of the core layer. Such brazing sheet product may be used in various applications where both sides are used for the joining of the brazing sheet.

In an embodiment the interlayer is applied on at least one side of the core layer, the interlayer having a corrosion potential difference against the core layer as measured according to ASTM-G69 of at least 10 mV, preferably of at least 30 mV, versus SCE.

According to another preferred embodiment of the present invention an interlayer is formed on at least one side of the core layer wherein the interlayer comprises either a sacrificial (anode) material which is less corrosion resistant than the core layer or a protective material which is more corrosion resistant than the core layer. Preferably, the interlayer comprises either an Al—Mn alloy composition of the AA3xxx-type or a pure aluminium alloy of the AA1xxx-type or an AlMgSi alloy of the AA6xxx-type, each optionally with the addition of Zn to as much as about 3%, and preferably to as much as 1.5%. All percentages in this application are by weight unless otherwise indicated.

Through the use of an interlayer between the core layer and the clad layer comprising the filler material, one or more of the following advantages are obtained:

Firstly, the overall corrosion resistance can be enhanced while—at the same time—a considerable amount of copper can be used within the core layer, thereby obtaining an overall corrosion performance which is comparable to or better than conventional AA3xxx-type core materials or AA6xxx-type core materials and even high performance Long Life materials, combined with a high overall strength of the material.

Secondly, the interlayer serves as a barrier layer and prevents the diffusion of magnesium from the core layer to the clad layer and the diffusion of silicon from the clad layer to the core layer. By such reduction of element migration throughout the layers improved properties of the brazing sheet are achieved like better brazeability and mechanical properties.

A preferred interlayer of the present invention comprises an Al—Mn alloy comprising essentially the following composition (in weight %):
Mn: 0.8 to 1.5
Si: $\leq 0.5$
Cu: $\leq 0.5$
Mg: $\leq 0.3$
Fe: $\leq 0.5$
Ti: $\leq 0.2$, the balance essentially aluminium and incidental elements and impurities, each <0.05%, total <0.15%.

Even more preferred, the interlayer of the present invention comprises zinc, in addition to or instead of manganese, preferably in a range of (in weight %) 0.50 to 2.5, more preferably in a range of 1.0 to 1.5. The addition of zinc makes the corrosion potential of the sacrificial anode material less noble in order to enhance the corrosion protection effect. It is believed that the interlayer deflects the corrosion path thereby protecting the core layer from being effected. The effect of adding zinc is insufficient when the amount is not enough. However, if zinc is added in a too high amount the melting point of the alloy is adversely decreased in the direction of the brazing temperature.

According to another preferred embodiment of the present invention the clad layer is formed on both sides of the core layer while the interlayer is formed on at least one side of the core layer in between the core layer and the clad layer. Since a brazing sheet in use has commonly one side which is exposed to a corrosive atmosphere such side should contain the interlayer in between the core layer and the clad layer in order to protect the core layer from corrosion after brazing. The ratio of thickness of the core layer and the interlayer is preferably in a range of $10 \leq$ core layer/interlayer$\leq 50$, wherein the interlayer has preferably a thickness of at least 40 µm. Such thickness is advantageous for multi-clad brazing sheet products of about 0.4 to 2.0 mm total thickness.

The thickness of the core layer (in percent compared to the total thickness of the brazing sheet) is preferably in a range of 60 to 90%, the thickness of the interlayer (in percent compared to the total thickness of the brazing sheet) is preferably in a range of 5 to 25% and the thickness of the clad layer is preferably (in percent compared to the total thickness of the brazing sheet) in a range of 5 to 15%.

A brazed assembly according to the present invention comprises a brazing sheet with a core layer as described above, an interlayer on one or both sides of the core layer and a clad layer of the Al—Si-type (filler alloy) on at least one interlayer, that means on at least one side of the layered structure.

The present invention also comprises the use of a brazing sheet as described above or of an assembly as described above for a brazing application such as a heat exchanger, as for example a radiator, an oil cooler, an inter cooler, a heater core, an evaporator or a condenser or similar applications and assemblies which are produced by joining brazing sheets for forming a compact assembly, mainly for the purpose of exchanging heat.

The present invention also provides a method for producing an aluminium alloy brazing sheet having high strength and good corrosion resistance, comprising the steps of:
a) casting a core ingot with the following composition comprising (in weight percent):
Cu: 1.2 to 4.0
Mn: 0.06 to 1.5
Mg: 0.06 to 1.5
Si: $\leq 0.5$
Zn: $\leq 0.4$
Fe: $\leq 0.5$, and optionally one or more of:
Zr: $\leq 0.25$
Cr: $\leq 0.25$
V: $\leq 0.25$
Ti: $\leq 0.25$, the balance essentially aluminium and incidental elements and impurities as a core material,
b) homogenising and/or pre-heating the core ingot after casting,
c) casting a clad ingot comprising an Al—Si based filler alloy, homogenising and/or pre-heating the clad ingot after casting and hot rolling the clad ingot to a rolled clad member,
d) superposing the core ingot and the hot rolled clad member to form a layered member, e) hot rolling the layered member and optionally cold rolling into a rolled product,
f) optionally inter annealing before and/or between cold rolling,
g) optionally end annealing, and
h) optionally ageing the rolled and optionally inter/end-annealed product.

It is furthermore possible to additionally cast an interlayer ingot (ingot for producing the interlayer) comprising preferably either an Al—Mn alloy composition of the AA3xxx-type or pure aluminium of the AA1xxx-type or an AlMgSi alloy of the AA6xxx-type, optionally with the addition of Zn, homogenising and/or pre-heating the interlayer ingot after casting and hot rolling the interlayer ingot to a rolled interlayer member (rolled sheet used as an interlayer), and superposing the core ingot, the interlayer member and the hot rolled clad member (rolled sheet used as a clad layer, made from another clad ingot) to form the multi-layered member. Here, it is advantageous to provide a rectangular groove in the core ingot by scalping out the groove in the size of the rolled inter member and the hot rolled clad member. Then, in the groove, a slice of rolled inter member and—on top of that—a slice of rolled clad member is placed, thereafter using the edge between the core material and clad material for weld-seaming the layered structure for hot rolling the layered member and optionally cold rolling into a rolled product.

According to another preferred embodiment of the present invention a new method for producing a multi-layered brazing sheet is presented: The method comprises the production of an aluminium alloy multi-clad or multi-layered brazing sheet by a method comprising the steps of:
a) casting a clad ingot, thereby using a composition as described above as a center core layer and preferably an Al—Mn alloy composition of the AA3xxx-type or pure aluminium of the AA1xxx-type or an AlMgSi alloy of the AA6xxx-type, optionally with the addition of Zn, as an interlayer on both sides of the center core layer, thereby forming the clad ingot (ingot with three layers of material, one center core material, covered on both sides with interlayer material),
b) homogenising and/or pre-heating the clad ingot after casting,
c) casting a clad layer ingot comprising an Al—Si based filler alloy, homogenising and/or pre-heating the clad layer ingot after casting and hot rolling the clad layer ingot to a rolled clad member, and
d) superposing the clad ingot and the hot rolled clad layer member to form the multi-layered member,
e) hot rolling the multi-layered member and optionally cold rolling the multi-layered member into a rolled product,
f) optionally inter-annealing before and/or between cold rolling passes,
g) optionally final annealing, and
h) optionally ageing the rolled and optionally inter- and/or final annealed product.

Such method has the advantage that the core ingot and the integrated interlayer on both sides of the core ingot are cast at the same time, thereby reducing costs and the problem of shifting layers during hot rolling or roll cladding.

Other cladding techniques regular in the art such as spray cladding or continuous cast cladding can be applied in an analogous way to produce the multi-layered material of the present invention.

The present invention discloses also a preferred method for producing a brazed assembly as described above, by heating an assembly of brazing sheets, which are superposing each other and which are produced as described above, preferably through a method for casting a clad ingot, to the brazing temperature. A typical brazing cycle comprises for example heating to a first temperature within a first time interval and to a second temperature within a second time interval, dwelling the assembly at the second temperature for a third time interval and cooling the assembly at a certain cooling rate.

As an example, the first temperature is in a range of about 500° C. to 550° C., the second temperature is in a range of about 580° C. to 600° C., the first time interval is in a range of about 8 to 12 minutes, the second time interval is in a range of about 3 to 7 minutes, the third time interval is in a range of about 2 to 4 minutes and the cooling rate is typically in a range of about 50° C./min to 70° C./min.

Various brazing processes like for example vacuum brazing or controlled atmosphere brazing, the latter with the use of for example NOCOLOK flux, or fluxless brazing advantageously using nickel and/or iron and/or cobalt, can be applied.

The present invention hence discloses a brazing sheet which showed a core layer in which the intermetallics were small and uniformly distributed. The grain structure of the core alloys showed slightly elongated, recrystallized grains, the average grain size (width×length) was about 75×150 µm.

A decreased copper concentration towards the surface of the core layer could be found. Due to the lower copper concentration in the surface area the core alloy showed a significantly lower corrosion potential in the surface area, approaching the corrosion potential of the interlayer material. It is believed that thereby the interlayer protects the core layer from perforating corrosion, in particular against pitting corrosion. By the addition of zinc in the interlayer it is possible to provide the material an even higher corrosion potential difference thereby improving the overall corrosion performance, as shown in more detail below and in Table 4.

BRIEF DESCRIPTION OF THE DRAWINGS

The aforementioned and other features and advantages of the brazing sheet according to the invention will become readily apparent from the following detailed description of some preferred embodiments. Some examples are shown in the appended drawings.

Figure 1:
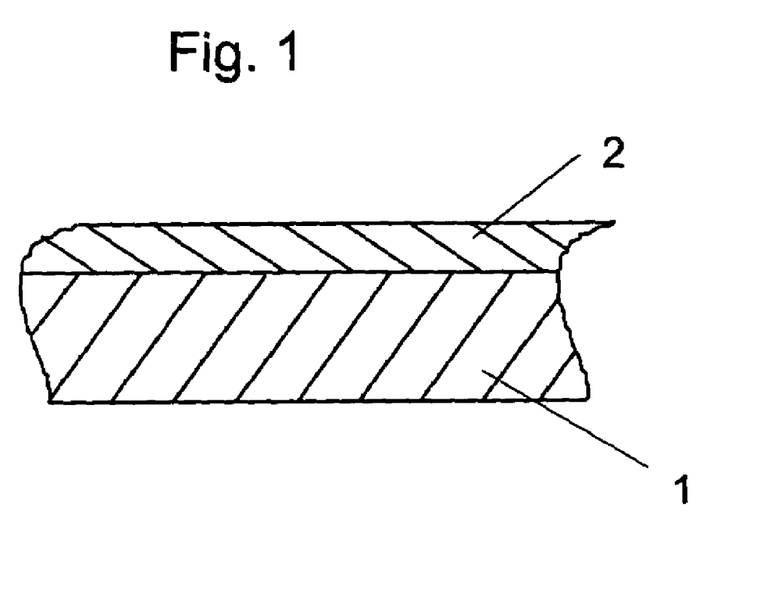
FIG. 1 shows schematically the basic brazing sheet structure according to the invention.
Figure 2:
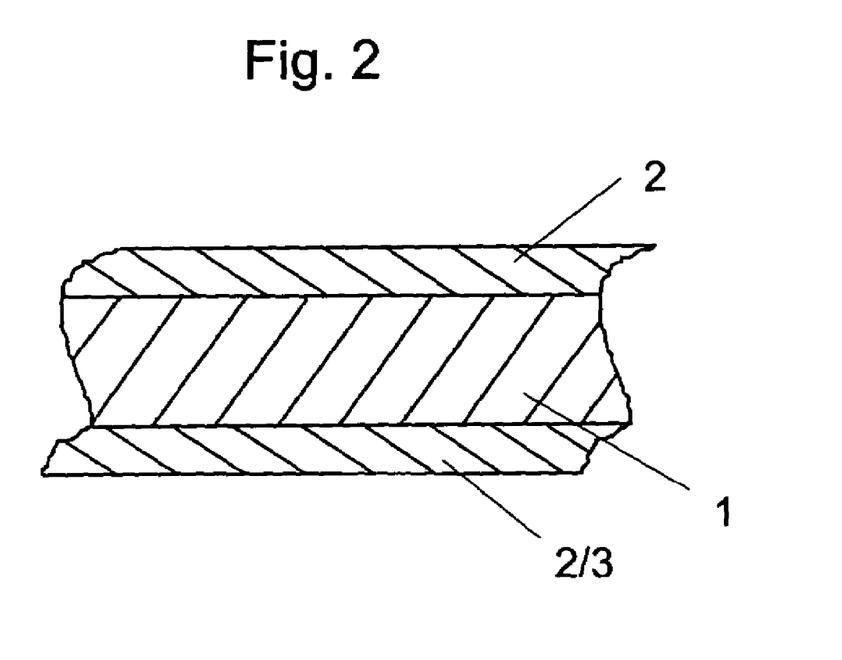
FIG. 2 shows schematically a three-layered structure of the brazing sheet of the present invention.
Figure 3:
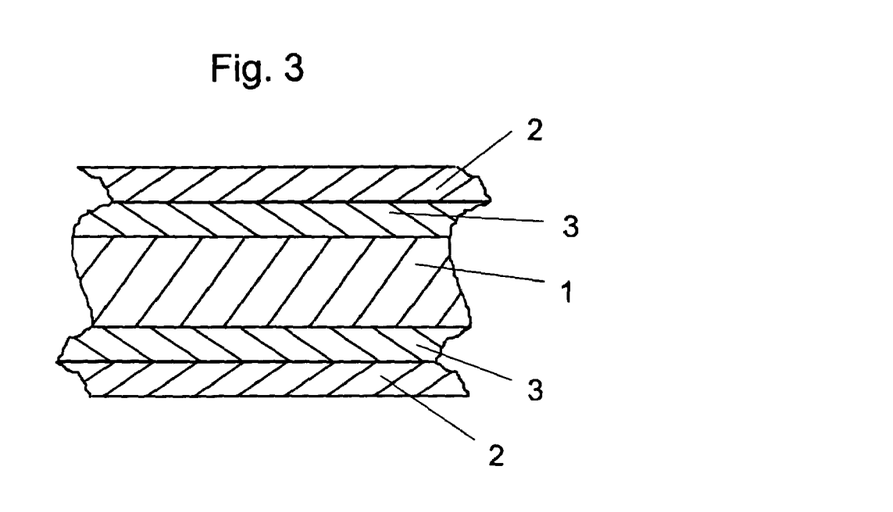
FIG. 3 shows schematically a five-layered structure according to the present invention.

FIG. 1 shows a basic structure of the brazing sheet according to the present invention with a core layer 1 and a distinct clad layer 2. As shown in FIGS. 2 and 3 the core layer 1 may be clad on both sides with the clad layer 2 of the Al—Si based filler alloy type or on one side with the clad layer 2 and on the other side with an interlayer 3. The other side with the interlayer 3 is exposed to the corrosive atmosphere.

Figure 4:
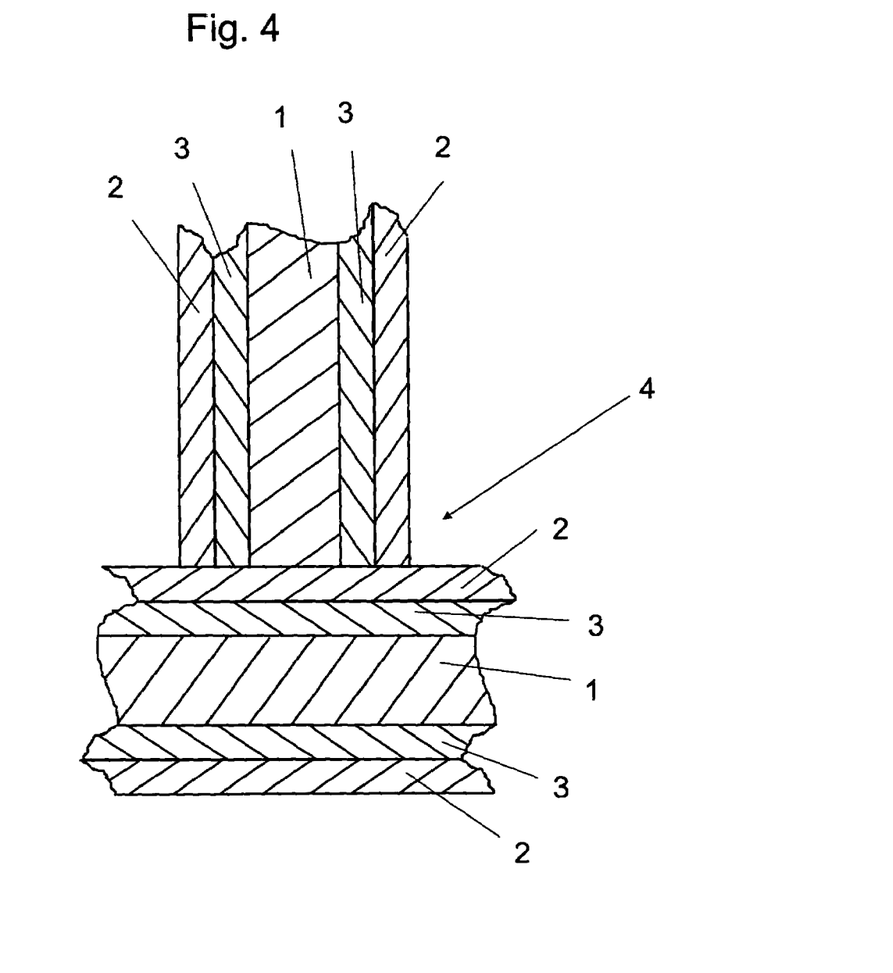
FIG. 4 shows schematically a section of a brazed assembly with superposed brazing sheets of the structure according to FIG. 3.

A preferred embodiment of the present invention is shown in FIGS. 3 and 4. The core layer 1 is embedded between two distinct interlayers 3 which are clad with clad layers 2. By producing an assembly containing the brazing sheets of the present invention, the clad layers 2 accumulate at the corner 4 of two superposed brazing sheets during brazing thereby being brazed together.

EXAMPLE

On a laboratory scale five different aluminium alloys have been cast into ingots for being used as an Al—Cu alloy core layer for a high strength aluminium alloy brazing sheet having the following chemical composition as set out in Table 1.

TABLE 1

Chemical composition of the DC-cast core aluminium alloys, in weight percent, balance aluminium and inevitable impurities.

| Alloy | Alloying Element | | | | | |
|---|---|---|---|---|---|---|
| | Cu | Si | Mn | Mg | Fe | Ti |
| 1 | 1.53 | 0.37 | 0.30 | 0.69 | 0.25 | 0.03 |
| 2 | 1.73 | 0.28 | 0.31 | 0.76 | 0.25 | 0.03 |
| 3 | 1.98 | 0.20 | 0.30 | 0.88 | 0.26 | 0.03 |
| 4 | 1.51 | 0.18 | 0.30 | 0.67 | 0.25 | 0.03 |
| 5 | 2.50 | 0.18 | 0.30 | 0.01 | 0.25 | 0.03 |

The cast ingots have been sawn into rolling blocks of approx. 100×80×80 mm. After a homogenisation treatment the blocks were clad with a brazing filler layer of an AA4045 alloy and rolled down (to 0.4 or 1.0 mm) by a process route comparable to a standard process route used for brazing sheet materials. The multi-clad or multi-layered materials were then end-annealed to an O-temper condition at 350° C. for 3 hour, the heat-up and cool-down rate was about 30° C./hour. Then, the multi-clad material was subjected to a typical brazing cycle (dwell time of 4 min at 590° C.). The mechanical properties of the multi-clad alloys in the O-temper condition and after brazing and 30 days natural ageing are given in Table 2.

TABLE 2

Tensile properties and elongation of core alloys 1 to 5 of Table 1 in O-temper condition, and post braze proof strength after 30 days natural ageing (Rp(p.b.)), and incipient melting temperature (T-Melt, measured by DSC)

| Core Alloy | Rp (MPa) | Rm (MPa) | A80 (%) | Rp (p.b.) (Mpa) | T-Melt (° C.) |
|---|---|---|---|---|---|
| 1 | 55 | 159 | 14.6 | — | 594 |
| 2 | 50 | 150 | 15.0 | 165 | 596 |
| 3 | 50 | 148 | 14.0 | — | 592 |
| 4 | 49 | 149 | 17.1 | 140 | 610 |
| 5 | 44 | 136 | 17.6 | — | 608 |

Table 2 shows that in O-temper condition the multi-clad alloys were considerably soft. The formability assessed by the elongation of the multi-clad alloys was reasonably good (14 to 18%). The incipient melting point was above 590° C., wherein it has been found that the addition of silicon and magnesium significantly decreases the incipient melting point where an extra addition of about 0.2% silicon decreases the incipient melting point by about 15° C. Hence, the decreasing silicon content resulted in an increasing melting point. Especially alloys 4 and 5 showed good properties (mechanical properties and melting point) with a low silicon content. Alloys 2 and 4 were tested with regard to the post braze tensile yield strength and very good values of 140 MPa and 165 MPa were measured.

Furthermore, alloy no. 4 has been further tested with regard to two different interlayer alloys interposed between the core alloy and the filler alloy. On a laboratory scale two different aluminium alloys have been cast thereby containing two different alloy compositions for the interlayer. The chemical compositions are set out in Table 3.

TABLE 3

Chemical composition of the DC-cast interlayer alloys in weight percent, Zr ≦ 0.05, Ti ≦ 0.05, balance aluminium and inevitable impurities.

| Interlayer Alloy | Alloying Element | | | | | |
|---|---|---|---|---|---|---|
| | Mn | Si | Cu | Mg | Zn | Fe |
| 1 | 1.07 | 0.19 | 0.10 | 0.02 | 0.00 | 0.31 |
| 2 | 1.05 | 0.19 | 0.10 | 0.02 | 1.34 | 0.31 |

Both alloys as shown in Table 3 were used in combination with a core layer comprising alloy no. 4 of Table 1. Both filler and interlayer thickness were 10% of the total thickness. The post braze mechanical properties of the various multi-clad materials after 35 days of natural ageing have been tested and are given in Table 4.

TABLE 4

Post-braze mechanical properties after 35 days of natural ageing, corrosion performance (SWAAT test according to ASTM G85) of the multiclad materials, in combination with various thicknesses, end of test after 50 days.

| Alloy Core/Interl. | | Rp (MPa) | Rm (MPa) | A80 (%) | SWAAT (days) | Total thickness (mm) |
|---|---|---|---|---|---|---|
| 4 | 1 | 144 | 272 | 14.4 | 29 | 0.4 |
| 4 | 2 | 138 | 263 | 15.4 | 49 | 0.4 |
| 4 | 1 | 141 | 273 | 18.3 | 50 | 1.0 |
| 4 | 2 | 140 | 275 | 20.0 | 50 | 1.0 |

The SWAAT test results show excellent corrosion behaviour of the materials when compared to standard brazing materials. Furthermore, it has been shown that the corrosion resistance when measured in a SWAAT test of a multi-clad material with an interlayer comprising zinc is better than that of one with an interlayer without comprising zinc. The post braze proof strength of 140 MPa of alloy no. 4 is superior to most of the prior art core alloys. Hence, the multi-clad or multi-layered brazing sheet of the present invention has a very high post braze strength in combination with very good corrosion properties and a relatively high incipient melting point thereby adding good brazing properties to the structure.

Having now fully described the invention, it will be apparent to one of ordinary skill in the art that many changes and modifications can be made without departing from the spirit or scope of the invention as hereon described.

The invention claimed is:

1. High strength aluminium alloy brazing sheet, comprising:
an Al—Cu core layer consisting essentially of the following core layer composition (in weight percent):
Cu: 1.2 to 2.5
Mn: 0.06 to 0.45
Mg: 0.06 to 1.5
Si: 0.1 to 0.25
Zn: <0.4
Fe: <0.5,
and optionally one or more of:
  Zr: <0.25
  Cr: <0.25
  V: <0.25
  Ti: <0.25, the balance aluminium and incidental elements and impurities, a clad layer having a clad layer composition comprising an Al—Si based filler alloy and being respectively applied on each side of the core layer, and an interlayer having an interlayer composition comprising either an Al—Mn alloy composition of the AA3xxx-type or an AlMgSi alloy of the AA6xxx-type, on at least one side of the core layer, the interlayer comprising either a sacrificial anode material which is less corrosion resistant than the core layer or a protective material which is more corrosion resistant than the core layer, and having a corrosion potential difference against the core layer as measured according to ASTM G69 of at least 10 mV versus SCE, wherein if the interlayer comprises the Al—Mn alloy composition, the interlayer Al—Mn alloy composition consists essentially of the following composition (in weight percent):
Mn: 0.8 to 1.5
Zn 0.5 to 2.5
Si: <0.5
Cu: <0.5
Mg: <0.3
Fe: <0.5
Ti: <0.2,
the balance aluminium and incidental elements and impurities.

2. Brazing sheet according to claim 1, wherein the amount (in weight %) of Mg in the core layer is in a range of 0.2 to 0.95.

3. Brazing sheet according to claim 1, wherein the amount (in weight %) of Zn in the core layer is in a range of at most 0.25.

4. Brazing sheet according to claim 1, wherein the amount (in weight %) of Fe in the core layer is in a range of 0.1 to 0.4.

5. Brazed assembly comprising a brazing sheet as claimed in claim 1, wherein the assembly is composed of five layered brazing sheet, comprising the core layer, a said interlayer on each side of the core layer and a said clad layer respectively on each side of the core layer, wherein each said clad layer is on a respective said interlayer.

6. Brazed assembly comprising at least one brazing sheet according to claim 1, and a four layered brazing sheet comprising a core layer of said core layer composition, an interlayer of said interlayer composition on each side and a clad layer of said clad layer composition on one said interlayer, wherein the brazing sheets are superposed on each other so that the interlayer not covered by a said clad layer is facing outwardly, and the superposed brazed sheets are joined together by brazing facing clad layers.

7. Brazing sheet according to claim 1, wherein the amount (in weight %) of Cu in the core layer is in a range of 1.2 to 1.8.

8. Brazing sheet according to claim 1, wherein the amount (in weight %) of Cu in the core layer is in a range of, 1.3 to 2.5.

9. Brazing sheet according to claim 1, wherein the amount (in weight %) of Cu in the core layer is in a range of 1.3 to 1.8.

10. Brazing sheet according to claim 1, wherein the amount (in weight %) of Mn in the core layer is in a range of 0.1 to 0.45.

11. Brazing sheet according to claim 1, wherein the amount (in weight %) of Mg in the core layer is in a range of 0.3 to 0.8.

12. Brazing sheet according to claim 1, wherein the amount (in weight %) of Fe in the core layer is in a range of 0.10 to 0.30.

13. Brazing sheet according to claim 1, wherein an interlayer is applied on at least one side of the core layer, the interlayer having a corrosion potential difference against the core layer as measured according to ASTM G69 of at least 30 mV versus SCE.

14. A method of use of a brazing sheet as claimed in claim 1, in a brazing assembly comprising four or five layered brazing sheet, each brazing sheet comprising a core layer, a said interlayer on each side of the core layer and a said clad layer respectively on each side of the core layer, wherein each said clad layer is respectively on a respective said interlayer, comprising joining at least one said brazing sheet to another element which is the same or different.

15. A method of forming a brazing assembly comprising:
superimposing a plurality of brazing sheets, comprising at least one brazing sheet as claimed in claim 1 and a four layered brazing sheet comprising a core layer of said core layer composition, an interlayer of said interlayer composition on each side and a clad layer of said clad layer composition on one said interlayer, to form the brazing assembly, wherein said brazing sheets are superposed on each other so that the interlayer which is alternatively not covered by a clad layer is facing outwardly, comprising joining the superposed brazed sheets together by brazing facing clad layers.

16. Brazing sheet according to claim 1, wherein the interlayer comprises the Al—Mn alloy composition, the interlayer Al—Mn alloy composition consists of the following composition (in weight percent):
Mn: 0.8 to 1.5
Zn 0.5 to 2.5
Si: <0.5
Cu: <0.5
Mg: <0.3
Fe: <0.5
Ti: <0.2,
the balance aluminium and incidental elements and impurities.

17. High strength aluminium alloy brazing sheet, comprising an Al—Cu core layer and at least one clad layer, the core layer consisting essentially of the following composition (in weight percent):
Cu: 1.2 to 4.0
Mn: 0.06 to 0.45
Mg: 0.06 to 1.5
Si: 0.1 to 0.25
Zn: at most 0.4
Fe: at most 0.5,
and optionally one or more of:
Zr: at most 0.25
Cr: at most 0.25
V: at most 0.25
Ti: at most 0.25,
the balance aluminium and incidental elements and impurities, the clad layer comprising an Al—Si based filler alloy and being applied on at least one side of the core layer;
and an interlayer applied on at least one side of the core layer, the interlayer consisting essentially of a sacrificial anode material which is less corrosion resistant than the core layer, the interlayer consisting essentially of an Al—Mn alloy consisting essentially of the following composition (in weight percent):
Mn: 0.8 to 1.5
Zn 0.5 to 2.5
Si: at most 0.5
Cu: at most 0.5

Mg: at most 0.3

Fe: at most 0.5

Ti: at most 0.2, the balance consisting of aluminium and incidental elements and impurities.

18. Brazing sheet according to claim 17, wherein the amount (in weight %) of Cu in the core layer is in a range of 1.2 to 2.5.

19. Brazing sheet according to claim 17, wherein the amount (in weight %) of Mn in the core layer is in a range of 0.1 to 0.45.

20. Brazing sheet according to claim 17, wherein the clad layer is formed on both sides of the core layer, wherein the interlayer is formed on at least one side of the core layer between the core layer and the respective clad layer.

21. Brazing sheet according to claim 17, wherein the amount (in weight %) of Cu in the core layer is in a range of 1.3 to 4.0.

22. A method for producing an aluminium alloy brazing sheet having high strength and good corrosion resistance, comprising the steps of:

a) casting a core ingot with the following composition (in weight percent):

Cu: 1.2 to 4.0

Mn: 0.06 to 0.45

Mg: 0.06 to 1.5

Si: 0.1 to 0.25

Zn: <0.4

Fe: <0.5, optionally one or more of:

Zr: <0.25

Cr: <0.25

V: <0.25

Ti: <0.25, the balance consisting essentially of aluminium and incidental elements and impurities as a core material, b) homogenising and/or pre-heating the core ingot after casting, c) casting a clad ingot comprising an Al—Si based filler alloy, homogenising and/or pre-heating the clad ingot after casting and hot rolling the clad ingot to a rolled clad member, d) casting an interlayer ingot, homogenising and/or pre-heating the interlayer ingot after casting and hot rolling the interlayer ingot to a rolled interlayer member, e) superposing the core ingot, the interlayer member and the hot rolled clad member to form a layered member, f) hot rolling the layered member and optionally cold rolling the layered member into a rolled product, g) optionally inter annealing the layered member between cold rolling passes, h) optionally end annealing, and i) ageing the rolled and optionally inter/end-annealed product, the interlayer consisting essentially of a sacrificial anode material which is less corrosion resistant than the core layer, the interlayer consisting essentially of an Al—Mn alloy consisting essentially of the following composition (in weight percent):

Mn: 0.8 to 1.5

Zn 0.5 to 2.5

Si: at most 0.5

Cu: at most 0.5

Mg: at most 0.3

Fe: at most 0.5

Ti: at most 0.2, the balance consisting of aluminium and incidental elements and impurities.

23. Method according to claim 22, wherein the amount (in weight %) of Mn in the core layer is in a range of 0.1 to 0.45 and the amount (in weight %) of Cu in the core layer is in a range of 1.2 to 2.5.

24. The method according to claim 22, wherein the interlayer Al—Mn alloy composition consists of the following composition (in weight percent):

Mn: 0.8 to 1.5

Zn 0.5 to 2.5

Si: <0.5

Cu: <0.5

Mg: <0.3

Fe: <0.5

Ti: <0.2, the balance aluminium and incidental elements and impurities.

25. A method for producing an aluminium alloy brazing sheet having high strength and good corrosion resistance, comprising the steps of:

casting a core ingot with the following composition (in weight percent):

Cu: 1.2 to 4.0

Mn: 0.06 to 0.45

Mg: 0.06 to 1.5

Si: 0.1 to 0.25

Zn: <0.4

Fe: <0.5, optionally one or more of:

Zr: <0.25

Cr: <0.25

V: <0.25

Ti: <0.25, the balance consisting essentially of aluminium and incidental elements and impurities as a core material, homogenising and/or pre-heating the core ingot after casting, casting a clad ingot comprising an Al—Si based filler alloy, homogenising and/or pre-heating the clad ingot after casting and hot rolling the clad ingot to form a hot rolled clad member, superposing the core ingot and the hot rolled clad member to form a layered member, hot rolling the layered member and optionally cold rolling the layered member into a rolled product, optionally inter annealing the layered member between cold rolling passes, optionally end annealing, and ageing the rolled and optionally inter/end-annealed product, wherein a) casting the core ingot comprises casting a multiclad ingot using the core ingot composition as a center core layer and an Al—Mn alloy composition of the AA3xxx-type or pure aluminium of the AA1xxx-type or an AlMgSi alloy of the AA6xxx-type, as an interlayer on both sides of the center core layer, b) homogenising and/or pre-heating the multiclad ingot after casting, c) casting a clad ingot comprising an Al-Si based filler alloy, homogenising and/or pre-heating the clad ingot after casting and hot rolling the clad ingot to form a hot rolled clad member, and d) superposing the multiclad ingot and the hot rolled clad member to form the layered member, the interlayer consisting essentially of either a sacrificial anode material which is less corrosion resistant than the core layer or a protective material which is more corrosion resistant than the core layer, wherein if the interlayer is an Al—Mn alloy composition, the interlayer consists essentially of the following composition (in weight percent):
Mn: 0.8 to 1.5
Zn 0.5 to 2.5
Si: at most 0.5
Cu: at most 0.5
Mg: at most 0.3
Fe: at most 0.5
Ti: at most 0.2,
the balance consisting of aluminium and incidental elements and impurities.

26. Method according to claim 25, wherein the amount (in weight %) of Mn in the core layer is in a range of 0.1 to 0.45.

27. High strength aluminium alloy brazing sheet, comprising an Al—Cu core layer and at least one clad layer, the core layer consisting essentially of the following composition (in weight percent):
Cu: 1.2 to 2.5
Mn: 0.06 to 0.45
Mg: 0.06 to 1.5
Si: 0.1 to 0.25
Zn: <0.4
Fe: <0.5,
optionally one or more of:
Zr: <0.25
Cr: <0.25
V: <0.25
Ti: <0.25,
the balance consisting essentially of aluminium and incidental elements and impurities, each 0.05%, total 0.20%;
the clad layer comprising an Al—Si based filler alloy and being applied on at least one side of the core layer,
further comprising an interlayer comprising an Al—Mn alloy composition consisting essentially of the following composition (in weight percent):
Mn: 0.8 to 1.5
Zn 0.5 to 2.5
Si: <0.5
Cu: <0.5
Mg: <0.3
Fe: <0.5
Ti: <0.2,
the balance aluminium and
incidental elements and impurities, each less than 0.05%, total less than 0.15%.

28. Brazing sheet according to claim 27, wherein the amount (in weight %) of Mn in the core layer is in a range of 0.1 to 0.45.

* * * * *